United States Patent
Watanabe (10) Patent No.: US 10,547,756 B1
(45) Date of Patent: Jan. 28, 2020

(54) IMAGE FORMING APPARATUS AND IMAGE FORMING METHOD

(71) Applicant: TOSHIBA TEC KABUSHIKI KAISHA, Shinagawa-ku, Tokyo (JP)

(72) Inventor: Yasuhiko Watanabe, Chigasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/033,762

(22) Filed: Jul. 12, 2018

(51) Int. Cl.
*H04N 1/00* (2006.01)
*G03G 15/00* (2006.01)

(52) U.S. Cl.
CPC ..... *H04N 1/00604* (2013.01); *G03G 15/5016* (2013.01); *H04N 1/00129* (2013.01); *H04N 2201/0094* (2013.01)

(58) Field of Classification Search
None
See application file for complete search history.

(56) References Cited

U.S. PATENT DOCUMENTS

| 10,035,616 | B1* | 7/2018 | Hood | B65B 57/02 |
| 2015/0336759 | A1* | 11/2015 | Tsuyuki | B65H 1/04 |
| | | | | 271/258.01 |
| 2017/0160688 | A1* | 6/2017 | Kurohata | B65H 1/04 |

FOREIGN PATENT DOCUMENTS

| JP | 2004-133070 A | 4/2004 |
| JP | 2011-230896 A | 11/2011 |

* cited by examiner

*Primary Examiner* — Frantz Bataille
(74) *Attorney, Agent, or Firm* — Foley & Lardner LLP (57) ABSTRACT

An image forming apparatus includes a function controller. The function controller performs control so as not to execute a conveyance function when function information, which indicates whether to restrict execution of a conveyance function for conveying a sheet for each conveyance source of the sheet or each conveyance destination of the sheet, indicates that the execution of the conveyance function is restricted. The function controller performs control to execute the conveyance function when the function information indicates that the execution of the conveyance function is not restricted.

20 Claims, 4 Drawing Sheets

| MODE | EXECUTION MODE | FIRST TRAY | SECOND TRAY | THIRD TRAY | FOURTH TRAY | SHEET DISCHARGE SECTION | SCANNER SHEET DISCHARGE SECTION | IN-BODY SHEET DISCHARGE SECTION |
|---|---|---|---|---|---|---|---|---|
| NORMAL MODE | 1 | 0 | 0 | 1 | 1 | 0 | 0 | 1 |
| PACKAGING MODE | 0 | 0 | 0 | 0 | 0 | 0 | 0 | 0 |

IMAGE FORMING APPARATUS AND IMAGE FORMING METHOD

FIELD

Embodiments described herein relate to an image forming apparatus and an image forming method.

BACKGROUND

A sheet feed tray of an image forming apparatus performs a tray-up operation at a timing at which a power supply of the image forming apparatus is turned on or at a timing at which a sheet feed tray is opened or closed. The image forming apparatus detects a remaining quantity of sheets in a sheet housing section in the tray-up operation. A user of the image forming apparatus may use a part of the sheet feed tray as a container.

DETAILED DESCRIPTION

As noted above, a user of the image forming apparatus may use a part of the sheet feed tray as a container. For this reason, there is a case in which in the image forming apparatus, the sheet feed tray is damaged due to the tray-up operation.

In accordance with at least one embodiment, an image forming apparatus comprises a function controller. The function controller performs control so as not to execute a conveyance function if function information, which indicates whether to restrict execution of a conveyance function for conveying a sheet for each conveyance source of the sheet or each conveyance destination of the sheet, indicates that the execution of the conveyance function is restricted, or performs control to execute the conveyance function if the function information indicates that the execution of the conveyance function is not restricted.

Figure 1:
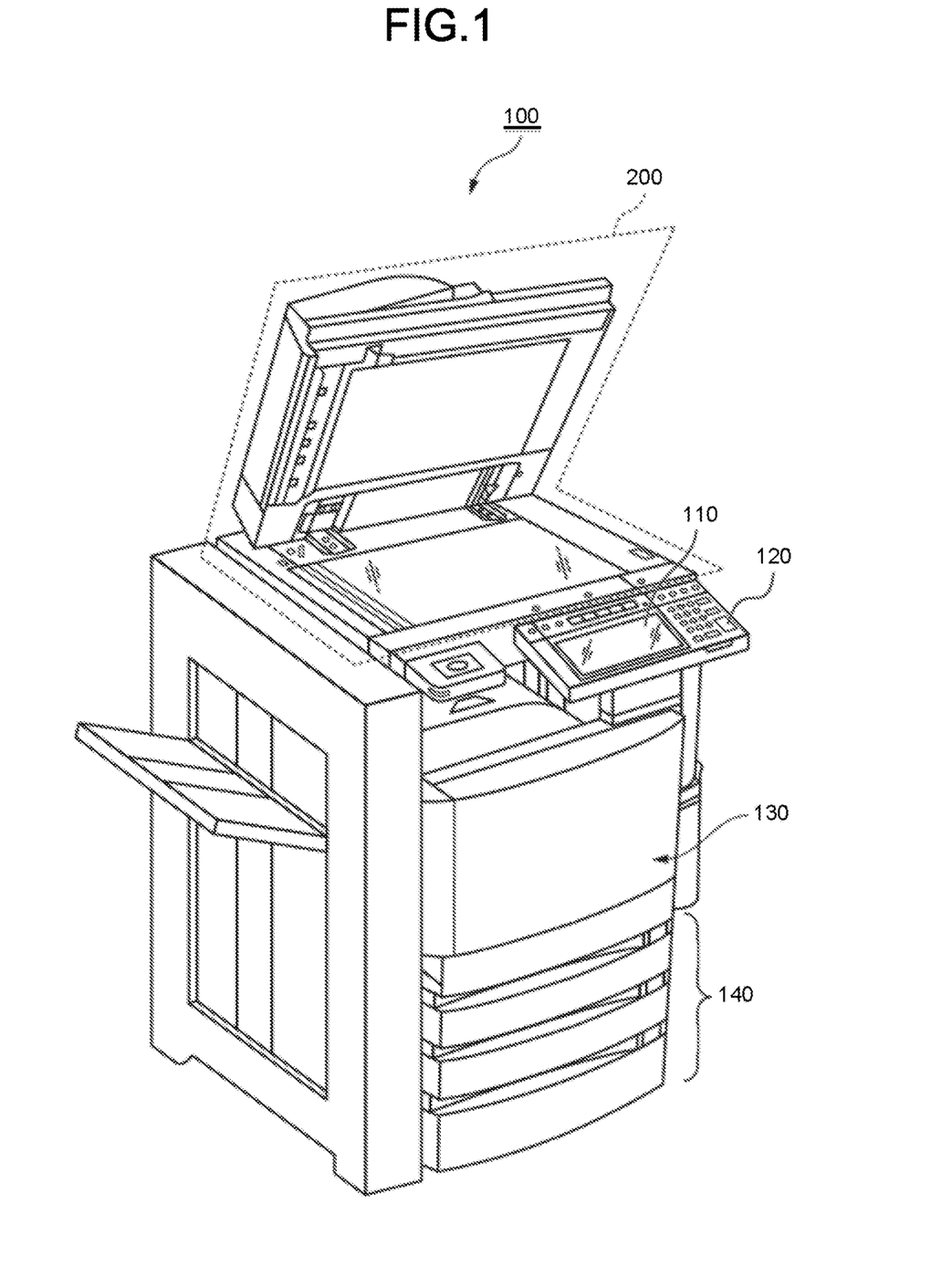
FIG. 1 is an external view illustrating an example of an overall configuration of an image forming apparatus according to at least one embodiment.

FIG. 1 is an external view illustrating an example of an overall configuration of an image forming apparatus 100 according to at least one embodiment. For example, the image forming apparatus 100 may be a multi-functional peripheral. The image forming apparatus 100 includes a display 110, a control panel 120, a printer section 130, a sheet housing section 140 and an image reading section 200. The printer section 130 of the image forming apparatus 100 may be a device for fixing a toner image or an inkjet type device.

The image forming apparatus 100 forms an image on a sheet using a developer such as a toner. The sheet is, for example, a paper or a label paper. Any sheet-type recording medium can be used for the image formation as long as the image forming apparatus 100 can form an image on a surface thereof.

The display 110 is an image display device such as a liquid crystal display, an organic EL (Electro Luminescence) display and the like. The display 110 displays various information relating to the image forming apparatus 100.

The control panel 120 includes a plurality of buttons. The control panel 120 receives an operation input by a user. The control panel 120 outputs a signal in response to an operation executed by the user to a controller of the image forming apparatus 100. Furthermore, the display 110 and the control panel 120 may be integrally formed as a touch panel.

The printer section 130 forms an image on the sheet based on image information generated by the image reading section 200 or image information received through a communication path. The printer section 130 forms an image through the following processes, for example. An image forming section of the printer section 130 forms an electrostatic latent image on a photoconductive drum based on the image information. The image forming section of the printer section 130 forms a visible image by attaching the developer to the electrostatic latent image. The toner is provided as the developer. A transfer section of the printer section 130 transfers the visible image onto the sheet. A fixing section of the printer section 130 fixes the visible image on the sheet by heating and pressurizing the sheet. The sheet on which the image is formed may be a sheet housed in the sheet housing section 140, or a sheet that is manually fed.

The sheet housing section 140 houses the sheet subjected to the image formation by the printer section 130.

The image reading section 200 reads the image information of a reading object as intensity of light. The image reading section 200 records the read image information. The recorded image information may be transmitted to another information processing apparatus via a network. The recorded image information may be used to form an image on the sheet by the printer section 130.

Figure 2:
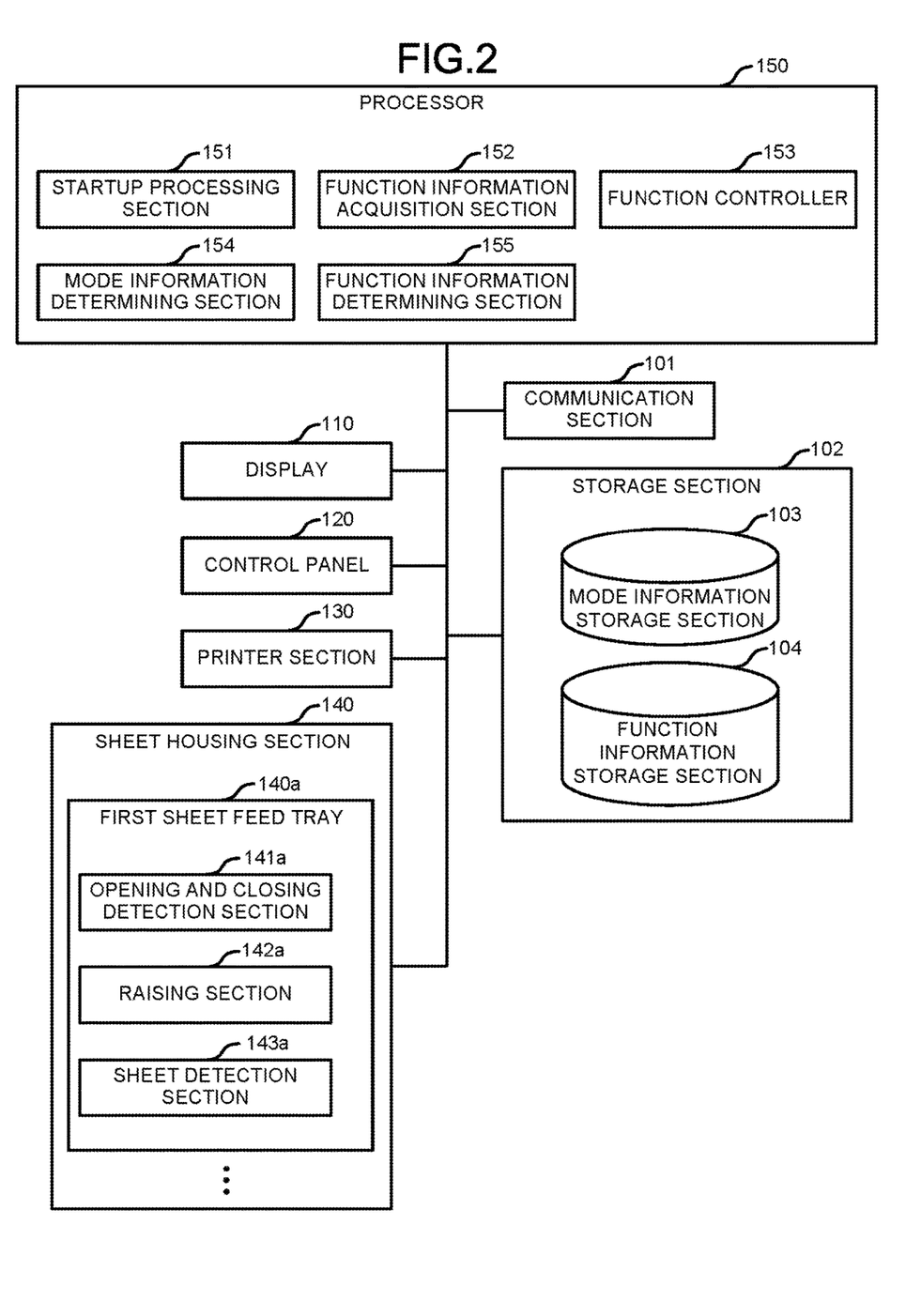
FIG. 2 is a functional block diagram illustrating a configuration of the image forming apparatus according to at least one embodiment.

FIG. 2 is a functional block diagram illustrating a configuration of the image forming apparatus according to at least one embodiment. The image forming apparatus 100 comprises a communication section 101, a storage section 102, the display 110, the control panel 120, the printer section 130, the sheet housing section 140 and a processor 150. The description of the configurations of the display 110, the control panel 120 and the printer section 130 is omitted.

The communication section 101 is a network interface. The communication section 101 is connected to an external terminal such as a personal computer, a smartphone, a tablet computer, a server or the like via a network in a communicable manner. The communication section 101 is connected according to a communication method such as a LAN (Local Area Network) or PSTN (Public Switched Telephone Networks), for example.

The storage section 102 stores various data used to control functions of the image forming apparatus 100. The storage section 102 is a storage device such as a magnetic hard disk device, a semiconductor storage device, a RAM (Random Access Memory) or the like. The storage section 102 includes a mode information storage section 103 and a function information storage section 104.

The mode information storage section 103 records mode information. The mode information is used for determining an operation mode of the image forming apparatus 100. Information indicating a packaging mode or a normal mode is contained in the mode information. The image forming apparatus 100 executes a predetermined operation according to the mode information. The mode information may be determined when the image forming apparatus 100 is manufactured or may be determined manually by a user. The mode information is not limited to two types, i.e., the packaging mode and the normal mode. For example, the mode information may store other modes such as a non-communication mode in which no communication is performed. The user refers to a user who purchases, leases or rents the image forming apparatus 100 to use.

The packaging mode is a mode designated when the image forming apparatus 100 is transported from a factory or when it is transported from an unpacking center. If the mode information indicates the packaging mode, equipment making up the image forming apparatus 100 is moved to a place designated in advance. For example, in the image forming apparatus 100, a carriage may be moved to an end of a document table. If the mode information indicates the packaging mode, the image forming apparatus 100 erases predetermined information from information recorded in a storage device such as a RAM in the image forming apparatus 100. The predetermined information may be, for example, the number of printed sheets or a remaining quantity of toner.

The normal mode is the mode designated when the image forming apparatus 100 is used by the user. If the mode information indicates the normal mode, the image forming apparatus 100 executes various functions of the image forming apparatus 100, such as a printing function, a scan function, a copying function, a facsimile transmission function and the like.

Figure 3:
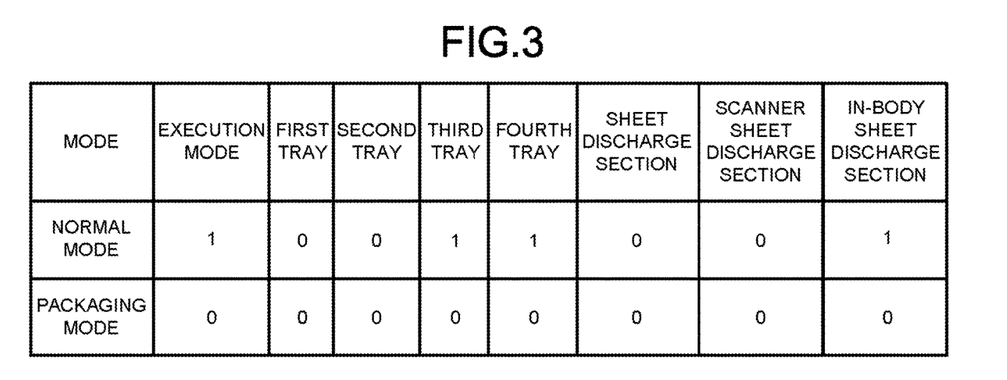
FIG. 3 is a diagram illustrating a function information table according to at least one embodiment.

The function information storage section 104 records a function information table. FIG. 3 is a diagram illustrating a specific example of the function information table according to at least one embodiment. The function information table has a function information record. The function information record includes values of a mode, an execution mode, a first tray, a second tray, a third tray, a fourth tray, a sheet discharge section, a scanner sheet discharge section, and an in-body sheet discharge section, where the respective trays and discharge sections (which may also be referred to as dischargers) may be a source or destination. The function information record records whether to restrict the execution of a conveyance function for conveying a sheet for one or more of the sheet conveyance sources or one or more of the sheet conveyance destinations. In at least one embodiment, the function information record records whether to restrict the execution of a conveyance function for conveying a sheet for each sheet conveyance source or each sheet conveyance destination.

The mode is identification information for identifying each record in the function information table. The mode is uniquely assigned to each record. The mode is associated with a value stored in the mode information. For example, if the normal mode is stored in the mode information, the normal mode is associated as the value of the mode. For example, if the packaging mode is stored in the mode information, the packaging mode is associated as the value of the mode.

The execution mode is identification information for identifying the operation mode of the image forming apparatus 100. The execution mode is represented by binary values such as 1 or 0. The image forming apparatus 100 operates in the mode in which the value of the execution mode is 1.

The first tray in the function information record holds a value of function information of a first tray of the sheet housing section 140. The function information indicates whether to restrict the function of the device. The function information is represented by binary values such as 1 or 0. If the value of the function information is 0, the function of a target device is restricted. If the value of the function information is 1, the function of the target device is not restricted. For example, if the value of the first tray is 0, the function of the first tray is restricted. For example, if the value of the first tray is 1, the function of the first tray is not restricted. The function may be, for example, a tray-up operation described later, a function of detecting the presence or absence of the sheet, or a function of detecting a remaining quantity of sheets. If the value of the function information is 0, all the functions may be restricted or a part of the functions may be restricted. Since the second tray to the fourth tray are the same as the first tray, a description thereof is omitted.

The sheet discharge section in the function information record holds a value of the function information of a sheet discharge section of the image forming apparatus 100. The sheet discharge section of the image forming apparatus 100 is a place to which the sheet printed by the printer section 130 is discharged. The sheet discharge section supports the placed sheets. A space in which the discharged sheet is held is provided above the sheet discharge section. The sheet discharge section may be provided in a predetermined place of the image forming apparatus 100 or may be provided in a peripheral device such as a post-processing apparatus or the like.

The scanner sheet discharge section in the function information record holds a value of the function information of a scanner sheet discharge section of the image reading section 200. The scanner sheet discharge section of the image forming apparatus 100 is a place to which a sheet an image on which is read by the image reading section 200 is discharged. The scanner sheet discharge section supports the placed sheets. A space in which the discharged sheet is held is provided above the scanner sheet discharge section. The scanner sheet discharge section is provided in a predetermined place of the image reading section 200.

The in-body sheet discharge section in the function information record holds a value of the function information of an in-body sheet discharge section of the image forming apparatus 100. The in-body sheet discharge section of the image forming apparatus 100 is a place to which the sheet printed by the printer section 130 is discharged and on which the sheets are stacked. The in-body sheet discharge section supports the placed sheet. The in-body sheet discharge section is arranged at a position not protruding from the image forming apparatus 100. The in-body sheet discharge section is provided with a space in which the discharged sheets are stacked.

In an example shown in FIG. 3, in the function information record in an uppermost row of the function information table, the value of the mode is the "normal mode", the value of the execution mode is "1", the value of the first tray is "0", the value of the second tray is "0", the value of the third tray is "1", the value of the fourth tray is "1", the value of the sheet discharge section is "0", the value of the scanner sheet discharge section is "0", and the value of the in-body sheet discharge section is "1". Therefore, according to the record in the uppermost row of the function information table, the current operation mode of the image forming apparatus 100 is the "normal mode"; the values of function information of the first tray, the second tray, the sheet discharge section and the scanner sheet discharge are "0"; and the values of the third tray, the fourth tray and the in-body sheet discharge section are "1". Therefore, it can be known that the functions of the first tray, the second tray, the sheet discharge section and the scanner sheet discharge section are restricted, and the functions of the third tray, the fourth tray, and the in-body sheet discharge section are not restricted. The function information table shown in FIG. 3 is merely a specific example. Therefore, the function information table may have a configuration different from that shown in FIG. 3. For example, if the sheet housing section has five sheet feed trays, a value of a fifth tray may be held in the function information table. For example, the function information record may record a value of function information in association with a roller in the image forming apparatus 100 as information indicating the conveyance source of the sheet or the conveyance destination of the sheet.

Returning again to FIG. 2, and the description of the image forming apparatus 100 is continued. The sheet housing section 140 includes a plurality of the sheet feed trays. The sheet feed tray accommodates a sheet on which an image is formed. In the present embodiment, one sheet feed tray among the plural sheet feed trays is described as a first sheet feed tray 140a. The first sheet feed tray 140a includes an opening and closing detection section (detector) 141a, a raising section 142a and a sheet detection section (detector) 143a. Hereinafter, if the sheet feed trays, the opening and closing detection sections, the raising sections or the sheet detection sections are not specifically distinguished, they are simply merely referred to as the sheet feed tray, the opening and closing detection section, the raising section or the sheet detection section.

The opening and closing detection section 141a detects whether the first sheet feed tray 140a is opened or closed. The opening and closing detection section 141a is used for detecting opening and closing of the first sheet feed tray 140a. For example, if the first sheet feed tray 140a is opened, the opening and closing detection section 141a transmits an open signal indicating the first sheet feed tray 140a is opened to the processor 150. For example, if the first sheet feed tray 140a is closed, the opening and closing detection section 141a transmits a close signal indicating that the first sheet feed tray 140a is closed to the processor 150. The processor 150 detects opening or closing of the first sheet feed tray 140a by receiving an open signal or a close signal.

The raising section 142a is installed at the inner bottom of the first sheet feed tray 140a. The raising section 142a raises the bottom of the first sheet feed tray 140a in response to an instruction from the processor 150. The raising section 142a raises the bottom of the first sheet feed tray 140a by moving a sheet metal installed at the bottom of the first sheet feed tray 140a upwards. For example, the raising section 142a rotates a motor installed in the first sheet feed tray 140a. The raising section 142a may raise the bottom by moving the sheet metal upwards by a screw rotating manner with the rotated motor. The raising section 142a may raise the bottom by moving the sheet metal upwards using the elasticity of a spring. The raising section 142a may raise the bottom by moving the sheet metal uniformly upwards, or by tilting the sheet metal.

The sheet detection section 143a detects the presence or absence of the sheet placed on the first sheet feed tray 140a. The sheet detection section 143a outputs a sheet non-detection signal to the processor 150 if no sheet is placed on the first sheet feed tray 140a. The sheet detection section 143a outputs a sheet detection signal to the processor 150 when the sheet is placed on the first sheet feed tray 140a.

The sheet detection section 143a detects that a sheet placed on the bottom or the bottom raised by the raising section 142a contacts with the sheet detection section 143a. The sheet detection section 143a detects a remaining quantity of the sheets at a time when the sheet placed on the bottom or the bottom contacts with the sheet detection section 143a. The sheet detection section 143a detects the remaining quantity of the sheets based on at least one of (1) a time at which the bottom is raised by the raising section 142a, (2) an angle of the raised bottom or (3) a raised height of the raised bottom. For example, the sheet detection section 143a may detect a remaining quantity of sheets by acquiring a value of the remaining quantity from a table in which a value of any one of the raised time, an angle of the raised bottom or raised height of the raised bottom, and the value of the remaining quantity are associated with each other.

The sheet detection section 143a outputs a sheet non-detection signal to the processor 150 when the remaining quantity of the sheets is zero. The sheet detection section 143a outputs the sheet detection signal to the processor 150 when the remaining quantity of the sheets is one or more.

The first sheet feed tray 140a executes a plurality of functions under the control of the processor 150. The plurality of functions may include, for example, a function of detecting the presence or absence of the sheet, a function of detecting the remaining quantity of the sheets, or the tray-up operation. The function of detecting the presence or absence of the sheet refers to a function of detecting the presence or absence of the sheet in the sheet feed tray by the sheet detection section. The function of detecting the remaining quantity of the sheets refers to a function of detecting the remaining quantity of sheets in the sheet feed tray by the sheet detection section.

The tray-up operation is executed when the power supply of the image forming apparatus 100 is turned on or when the sheet feed tray is opened or closed. In the tray-up operation, the raising section of the sheet feed tray raises the bottom of the sheet feed tray. In the tray-up operation, the sheet detection section detects the remaining quantity of the sheet based on the angle or the raised height of the raised bottom. The sheet detection section outputs the sheet detection signal or the sheet non-detection signal to the processor 150 based on the detected remaining quantity of the sheets. The tray-up operation is an aspect of a conveyance function. The conveyance function is realized along with the movement of the sheet performed by the image forming apparatus 100. In the tray-up operation, by raising the bottom of the sheet feed tray, the sheet accommodated in the sheet feed tray is moved.

The processor 150 controls the operation of each section of the image forming apparatus 100. The processor 150 may be a device including a processor such as a CPU (Central Processing Unit) and a RAM, for example. By executing the function control program, the processor 150 functions as a startup processing section 151, a function information acquisition section 152, a function controller 153, a mode information determining section 154, and a function information determining section 155.

The startup processing section 151 executes a startup process when the power supply of the image forming apparatus 100 is turned on. The startup processing section 151 acquires the mode information recorded in the mode information storage section 103 in the startup process. The startup processing section 151 determines the value of the execution mode in the function information table recorded in the function information storage section 104 based on the acquired mode information. The startup processing section 151 acquires the function information record in which the value of the mode is the packaging mode from the function information table when the acquired mode information is the packaging mode. The startup processing section 151 records 1 as the value of the execution mode of the acquired start information record. If the acquired mode information is the packaging mode, the startup processing section 151 acquires the function information record in which the value of the mode is the normal mode from the function information table. The startup processing section 151 records 0 as the value of the execution mode of the acquired start information record. If the acquired mode information is the normal mode, the startup processing section 151 acquires the function information record in which the value of the mode is the normal mode from the function information table. The startup processing section 151 records 1 as the value of the execution mode of the acquired start information record. If the acquired mode information is the normal mode, the startup processing section 151 acquires the function information record in which the value of the mode is the packaging mode from the function information table. The startup processing section 151 records 0 as the value of the execution mode of the acquired start information record. In the startup process, the startup processing section 151 instructs the processor 150 to perform the tray-up operation for each sheet feed tray of the sheet housing section 140.

The function information acquisition section 152 acquires the value of the function information from the function information table recorded in the function information storage section 104. For example, the function information acquisition section 152 acquires the value of the function information when the function controller 153 performs the tray-up operation. The function information acquisition section 152 acquires the value of the function information based on the value of the execution mode held in the function information record and the sheet feed tray on which the tray-up operation is executed. Specifically, the function information acquisition section 152 acquires the value of the function information from the function information record holding 1 as the value of the execution mode. The function information acquisition section 152 acquires the value of the function information of the sheet feed tray associated with the sheet feed tray on which the tray-up operation is performed. The function information acquisition section 152 acquires the value of the function information of the first tray if the tray-up operation is performed on the first sheet feed tray 140a. The function information acquisition section 152 outputs the acquired value of the function information to the function controller 153.

The function controller 153 controls execution of each function of the image forming apparatus 100. For example, the function controller 153 controls the execution of the tray-up operation. The function controller 153 controls the execution of the tray-up operation if the startup process is executed by the startup processing section 151 or if the open signal is output from any one of the sheet feed trays of the sheet housing section 140. The function controller 153 controls the execution of the tray-up operation based on the value of the function information acquired by the function information acquisition section 152. If the acquired value of the function information is 1, the function controller 153 executes the tray-up operation. If the acquired value of the function information is 0, the function controller 153 does not execute the tray-up operation.

The function controller 153 controls the execution of the tray-up operation for all sheet feed trays when the startup process is executed. In this case, the function controller 153 instructs the function information acquisition section 152 to acquire the function information of all sheet feed trays. Based on the value of the function information, the function controller 153 controls the execution of the tray-up operation for all sheet feed trays.

If the open signal is output from the sheet feed tray, the function controller 153 controls the execution of the tray-up operation on the sheet feed tray from which the open signal is output. In this case, the function controller 153 instructs the function information acquisition section 152 to acquire the function information of the sheet feed tray from which the open signal is output. The function controller 153 controls the execution of the tray-up operation based on the acquired value of the function information of the sheet feed tray.

The mode information determining section 154 determines the value of the mode information recorded in the mode information storage section 103. Specifically, the mode information determining section 154 determines the value of the mode information based on a received mode determination instruction. The mode information determining section 154 records the determined value of the mode information in the mode information storage section 103. The mode determination instruction includes the value of the mode information. The mode determination instruction may be received from the user via the control panel 120, for example. In this case, the control panel 120 receives an input for designating either one of the packaging mode and the normal mode. The control panel 120 outputs the received input as the mode determination instruction to the mode information determining section 154.

The function information determining section 155 determines the value of the function information recorded in the function information storage section 104. Specifically, the function information determining section 155 determines the value of the function information based on the received function information determination instruction. The function information determining section 155 records the determined value of the function information in the function information table stored in the function information storage section 104. The function information determination instruction includes the value of the function information and information for identifying the sheet feed tray. The function information determination instruction may be received from the user via the control panel 120, for example. The function information determining section 155 records the value of the function information for the sheet feed tray specified by the information for specifying the sheet feed tray among the values of the function information. The function information determining section 155 may record the value of the function information in the function information record in which the value of mode is the normal mode or in the function information record in which the value of the execution mode is 1. The function information determining section 155 is an aspect of a function information generating section (i.e., a function information generator). The function information generating section generates the function information based on the function information determination instruction.

Figure 4:
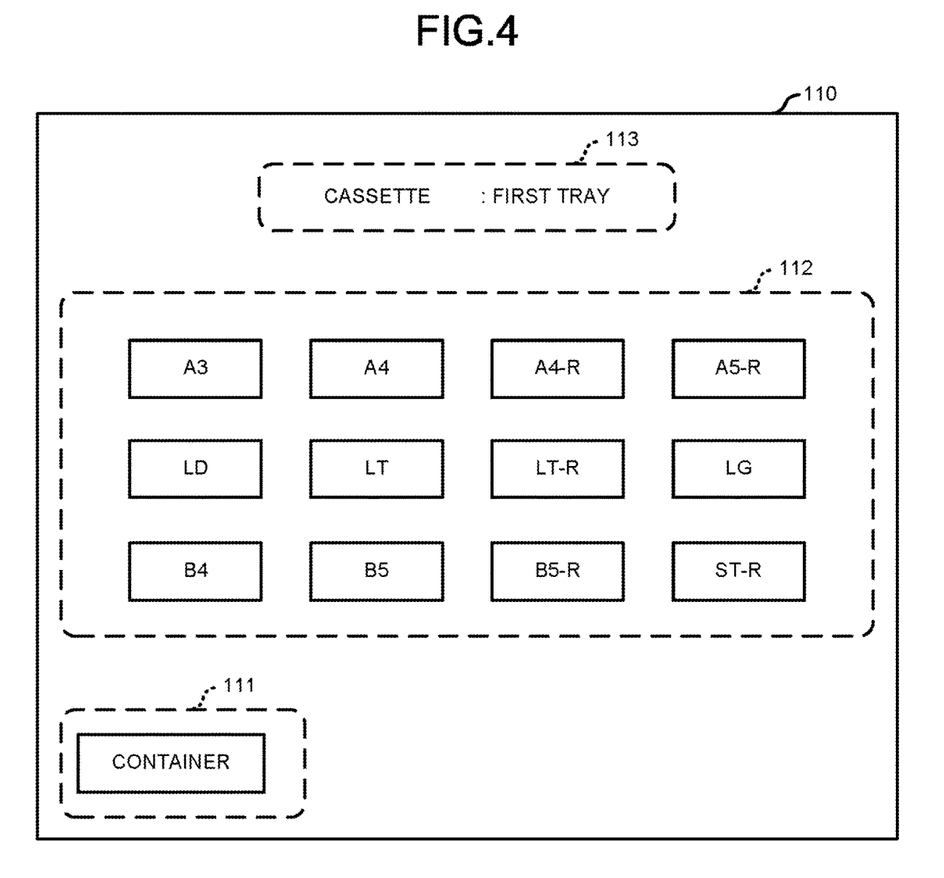
FIG. 4 is a diagram illustrating an input of function information according to at least one embodiment.

FIG. 4 is a diagram illustrating a specific example of input of the function information according to at least one embodiment. On the display 110, a screen for receiving a size of the sheet accommodated in the sheet feed tray is displayed. The display 110 includes an area 111, an area 112 and an area 113.

The area 111 is used for displaying a container image. The container image is selected when the user wants to restrict the function of the sheet feed tray. The container image is selected by being touched or by the user operating the control panel 120. If the container image is selected, the control panel 120 may receive 0 as the value of the function information.

The area 112 is used for displaying sheet size images. The sheet size image is selected when the user designates a size of the sheet accommodated in the sheet feed tray. The sheet size image is selected by being touched or by the user operating the control panel 120. If the sheet size image is selected, the control panel 120 may receive 1 as the value of the function information. In some embodiments, the area 111 may display text such as "FUNCTION RESTRICTION" instead of "CONTAINER," for example.

The area 113 is used for displaying a tray identification image indicating the designated sheet feed tray. The sheet feed tray indicated by the tray identification image is associated with the information for specifying the sheet feed tray. For example, the tray identification image in the area 113 indicates the first tray. Therefore, the first tray is associated as the information for specifying the sheet feed tray. Upon receiving the value of the function information, the control panel 120 outputs the received value of the function information and the information for specifying the sheet feed tray to the function information determining section 155 as the function information determination instruction.

Figure 5:
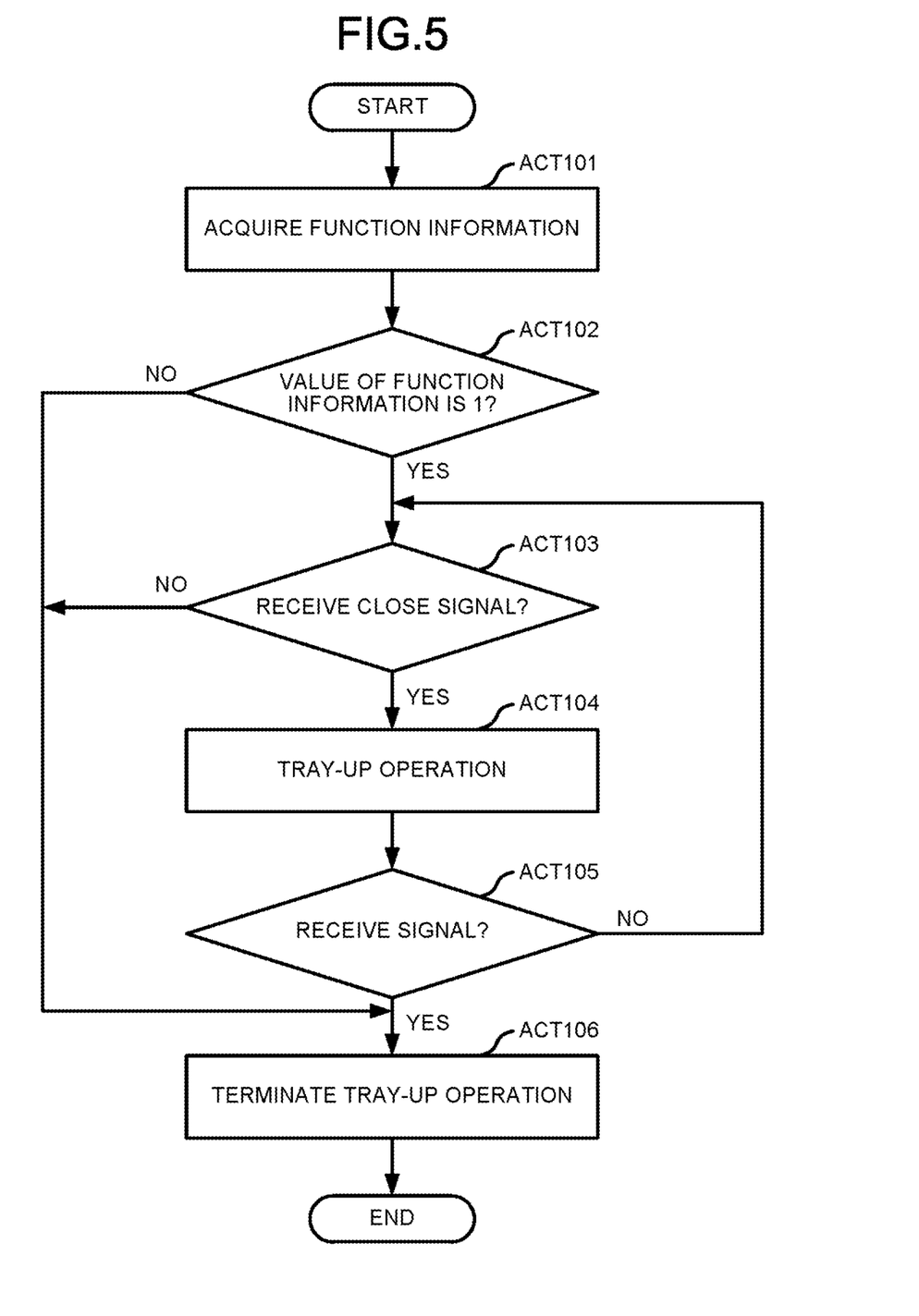
FIG. 5 is a flowchart for depicting a flow of a control of a tray-up operation according to at least one embodiment.

FIG. 5 is a flowchart for depicting a flow of the control of the tray-up operation according to at least one embodiment. The process of the flowchart is executed if the power supply of the image forming apparatus 100 is turned on or if the open signal is output from any one of the sheet feed trays of the sheet housing section 140. Specifically, the flowchart is executed at a timing at which the tray-up operation is executed. In the present flowchart, a case in which the tray-up operation is performed on the first sheet feed tray 140*a* is described as an example.

The function information acquisition section 152 of the image forming apparatus 100 acquires the function information table from the function information storage section 104 (ACT 101). The function information acquisition section 152 acquires the function information record in which 1 is held as the value of the execution mode. The function information acquisition section 152 acquires the value of the function information of the first sheet feed tray 140*a* on which the tray-up operation is executed from the function information record.

The function controller 153 of the image forming apparatus 100 determines whether or not the acquired value of the function information is 1 (ACT 102). If the value of the function information is not 1 (No in ACT 102), the flow proceeds to the process in ACT 106. If the value of the function information is 1 (Yes in ACT 102), the function controller 153 determines whether or not the close signal is received from the first sheet feed tray 140*a* (ACT 103). The close signal is output from the opening and closing detection section 141*a* if the first sheet feed tray 140*a* is closed. If the close signal is not received (No in ACT 103), the flow proceeds to the process in ACT 106.

If the close signal is received (Yes in ACT 103), the function controller 153 executes the tray-up operation on the first sheet feed tray 140*a* (ACT 104). If the sheet detection section 143*a* detects that there is the sheet in the sheet feed tray by the tray-up operation, the sheet detection section 143*a* outputs the sheet detection signal to the function controller 153. If the sheet detection section 143*a* does not detect the existence of the sheet in the sheet feed tray by the tray-up operation, the sheet detection section 143*a* outputs the sheet non-detection signal to the function controller 153.

The function controller 153 determines whether or not the sheet detection signal or the sheet non-detection signal is received (ACT 105). If neither the sheet detection signal nor the sheet non-detection signal is received (No in ACT 105), the flow proceeds to the process in ACT 103. If the sheet detection signal or the sheet non-detection signal is received (Yes in ACT 105), the function controller 153 terminates the tray-up operation (ACT 106).

In the image forming apparatus 100 with such the above-described configuration, the function information acquisition section 152 acquires the value of the function information relating to the sheet feed tray on which the tray-up operation is performed. The function controller 153 controls the execution of the tray-up operation based on the acquired value of the function information. For example, if the acquired value of the function information is 1, the function controller 153 performs the tray-up operation. For example, if the acquired value of the function information is 0, the function controller 153 does not perform the tray-up operation. If the sheet feed tray is used for other purposes such as a container, the user may set 0 as the value of the function information. Specifically, the user can set 0 as the value of the function information by selecting the container image displayed on the display 110 through touching the container image on the display 110 or operating the control panel 120. Therefore, even if the sheet feed tray is used for other purposes such as the container, it is possible to prevent the sheet feed tray from being damaged by executing the tray-up operation.

The image forming apparatus 100 operates in the packaging mode when it is transported from the factory or from the unpacking center. In the packaging mode, 0 is set as the value of the function information of all sheet feed trays in the image forming apparatus 100. Therefore, in a case of operating in the packaging mode, the function controller 153 does not perform the tray-up operation on all sheet feed trays. During the transportation of the image forming apparatus 100, packaging material is accommodated in the sheet feed tray.

In a case in which the function controller 153 does not have the function of controlling the execution of the tray-up operation, if the tray-up operation is executed while the packaging material remains in the sheet feed tray, there is a possibility of damaging the sheet feed tray. Therefore, in the packaging mode, by setting 0 as the value of the function information of all sheet feed trays in the image forming apparatus 100, even when the packaging material is left behind when unpacking, it is possible to prevent the sheet feed tray from being damaged.

Modification

The function controller 153 may issue a warning when the value of the function information relating to the sheet feed tray satisfies a predetermined condition for the function information record in which the value of the mode held by the function information record is the normal mode. The predetermined condition is, for example, a case in which all the values of the function information are 0. Specifically, the predetermined condition is a state in which sheet is not fed from the sheet feed tray when the image forming apparatus 100 operates in the normal mode. For example, a warning may be issued by enabling a buzzer to sound, by displaying an image indicating that the sheet is not fed to the display 110, or by lighting a lamp.

With such a configuration, it is possible for the user to prevent the state in which the printing cannot be performed by setting 0 as the values of all the function information of the sheet feed tray.

In addition to the tray-up operation, the function controller 153 may control other functions of the image forming apparatus 100. For example, the function controller 153 may control a sheet discharge place.

Specifically, the function controller 153 may perform control so as not to discharge sheet from the sheet discharge section or the in-body sheet discharge section. In this case, the function information acquisition section 152 acquires the value of the function information of the sheet discharge section or the in-body sheet discharge section from the function information record in which 1 is held as the value of the execution mode. The function information acquisition section 152 outputs the acquired value of the function information to the function controller 153. If the value of the function information of the sheet discharge section or the in-body sheet discharge section is 1, the function controller 153 performs control to discharge the sheet. If the value of the function information of the sheet discharge section or the in-body sheet discharge section is 0, the function controller 153 performs control so as not to discharge the sheet. The discharge of the sheet to the sheet discharge section or the in-body sheet discharge section is an aspect of the conveyance function.

With such a configuration, even when the user uses the sheet discharge section or the in-body sheet discharge section for other purposes such as storage, it is possible to prevent the discharged sheet from being damaged.

The function controller 153 may control an image reading function by the image reading section (image reader) 200. In this case, the function information acquisition section 152 acquires the value of the function information of the scanner sheet discharge section from the function information record in which 1 is held as the value of the execution mode. The function information acquisition section 152 outputs the acquired value of the function information to the function controller 153. If the value of the function information of the scanner sheet discharge section is 1, the function controller 153 performs control so as to execute image reading. If the value of the function information of the scanner sheet discharge section is 0, the function controller 153 performs control so as not to perform image reading. The discharge of the sheet to the scanner sheet discharge section is an aspect of the conveyance function.

With such a configuration, even when the user uses the scanner sheet discharge section for other purposes such as storage, it is possible to prevent a document on which the image reading operation is performed from being damaged.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
   a control panel configured to display a screen for receiving function information indicating whether to restrict execution of a conveyance function for conveying a sheet for at least one conveyance source of the sheet or at least one conveyance direction of the sheet;
   function information storage configured to store the received function information; and
   a processor configured to
      perform a control so as not to execute the conveyance function when the stored function information indicates that the execution of the conveyance function is restricted, or
      perform control to execute the conveyance function when the stored function information indicates that the execution of the conveyance function is not restricted.

2. The image forming apparatus according to claim 1, further comprising:
   a sheet feed tray configured to accommodate a sheet on which an image is formed, and in which the conveyance function is performed, wherein
   the processor is configured to control performance of the conveyance function for the sheet feed tray.

3. The image forming apparatus according to claim 2, wherein
   the sheet feed tray comprises a sheet detector configured to detect whether or not a sheet is accommodated in the sheet feed tray, and
   the conveyance function comprises a function of raising the sheet feed tray to contact the sheet detector, thereby enabling the sheet detector to detect whether or not the sheet is accommodated in the sheet feed tray.

4. The image forming apparatus according to claim 2, wherein:
   the control panel is configured to receive an input of an instruction for determining whether to restrict the execution of the conveyance function;
   the processor is configured to generate the function information based on the instruction; and
   the control panel is configured to receive the input of the instruction when a screen for receiving a setting of a size of the sheet accommodated in the sheet feed tray is displayed.

5. The image forming apparatus according to claim 2, wherein
   at least two sheet feed trays are provided, and
   the processor is configured to control whether or not the conveyance function is executed in each of the sheet feed trays based on the function information for each of the sheet feed trays.

6. The image forming apparatus according to claim 5, wherein
   the processor is configured to output a warning indicating that no sheet is fed to the image forming apparatus when the function information indicates that the conveyance function is not executed in all sheet feed trays.

7. The image forming apparatus according to claim 1, further comprising:
   mode information storage configured to store mode information indicating an operation mode of the image forming apparatus, wherein
   when the mode information indicates a packaging mode showing a state in which the image forming apparatus is packaged, the function information indicates that the execution of the conveyance function is restricted.

8. The image forming apparatus according to claim 1, further comprising:
   a sheet discharger to which a printed sheet is discharged, wherein the processor is configured to control whether or not the conveyance function is executed in the sheet discharger.

9. The image forming apparatus according to claim 1, further comprising:
an image reader configured to read image information of a reading object, wherein
the processor is configured to control whether or not the conveyance function is executed in the image reader.

10. The image forming apparatus according to claim 1, wherein the processor is configured to perform a control so as not to execute the conveyance function when function information, which indicates whether to restrict execution of the conveyance function for conveying a sheet for each conveyance source of the sheet or each conveyance destination of the sheet, indicates that the execution of the conveyance function is restricted.

11. An image forming method, comprising:
displaying, by a control panel, a screen for receiving function information indicating whether to restrict execution of a conveyance function for conveying a sheet for at least one conveyance source of the sheet or at least one conveyance direction of the sheet;
storing, in function information storage, the received function information; and
performing control of an image forming apparatus so as not to execute the conveyance function when the stored function information indicates that the execution of the conveyance function is restricted, or
performing control to execute the conveyance function when the stored function information indicates that the execution of the conveyance function is not restricted.

12. The image forming method according to claim 11, further comprising:
accommodating, in a sheet feed tray, a sheet on which an image is formed, wherein the conveyance function is performed in the sheet feed tray, and
controlling performance of the conveyance function for the sheet feed tray.

13. The image forming method according to claim 12, further comprising:
detecting, by a sheet detector, whether or not a sheet is accommodated in the sheet feed tray, and
raising the sheet feed tray to contact the sheet detector, thereby enabling the sheet detector to detect whether or not the sheet is accommodated in the sheet feed tray.

14. The image forming method according to claim 12, further comprising:
receiving an input of an instruction for determining whether to restrict the execution of the conveyance function when a screen for receiving a setting of a size of the sheet accommodated in the sheet feed tray is displayed; and
generating the function information based on the instruction.

15. The image forming method according to claim 12, further comprising:
controlling whether or not the conveyance function is executed in each of a plurality of sheet feed trays based on the function information for each of the plurality of sheet feed trays.

16. The image forming method according to claim 15, further comprising:
outputting a warning indicating that no sheet is fed to the image forming apparatus when the function information indicates that the conveyance function is not executed in all of the plurality of sheet feed trays.

17. The image forming apparatus according to claim 11, further comprising:
storing mode information indicating an operation mode of the image forming apparatus, and
indicating that the execution of the conveyance function is restricted when the mode information indicates a packaging mode showing a state in which the image forming apparatus is packaged.

18. The image forming method according to claim 11, further comprising:
controlling whether or not the conveyance function is executed in a sheet discharger to which a printed sheet is discharged.

19. The image forming method according to claim 11, further comprising:
reading, by an image reader, image information of a reading object, and
controlling whether or not the conveyance function is executed in the image reader.

20. The image forming method according to claim 11, further comprising:
performing a control so as not to execute the conveyance function when function information, which indicates whether to restrict execution of the conveyance function for conveying a sheet for each conveyance source of the sheet or each conveyance destination of the sheet, indicates that the execution of the conveyance function is restricted.

* * * * *